(12) United States Patent
Anderson et al.

(10) Patent No.: US 6,549,572 B1
(45) Date of Patent: Apr. 15, 2003

(54) METHOD AND APPARATUS FOR AUTOMATED TIME DOMAIN MONITORING IN OPTICAL NETWORKS

(75) Inventors: William T. Anderson, Red Bank, NJ (US); Thomas C. Banwell, Madison, NJ (US); Nim K. Cheung, Short Hills, NJ (US); James E. Hodge, Red Bank, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/304,274

(22) Filed: May 6, 1999

Related U.S. Application Data
(60) Provisional application No. 60/085,347, filed on May 13, 1998.

(51) Int. Cl.[7] .............................................. H04B 17/00
(52) U.S. Cl. ........................................................ 375/225
(58) Field of Search .................................. 375/376, 354, 375/360, 361, 225, 294; 356/73.1; 702/79

(56) References Cited

U.S. PATENT DOCUMENTS

| | | | | |
|---|---|---|---|---|
| 4,965,873 A | | 10/1990 | White | ........................ 360/41 |
| 5,838,749 A | * | 11/1998 | Casper et al. | ................. 331/18 |
| 5,963,312 A | * | 10/1999 | Roberts | ................. 250/227.17 |

* cited by examiner

Primary Examiner—Stephen Chin
Assistant Examiner—Kevin Kim
(74) Attorney, Agent, or Firm—Joseph Giordano; James W. Falk

(57) ABSTRACT

Methods and apparatuses are provided for determining characteristics of an input optical signal in an optical network. An optical signal monitoring apparatus estimates a minimum time interval between transitions in the input signal, determines a clock signal based on the estimated minimum time interval, and performs a time domain measurement on the input signal based on the determined clock signal. The optical signal monitoring apparatus samples the input signal based on the determined clock signal and determines the characteristics of the input signal.

41 Claims, 6 Drawing Sheets

METHOD AND APPARATUS FOR AUTOMATED TIME DOMAIN MONITORING IN OPTICAL NETWORKS

CROSS-REFERENCE TO RELATED APPLICATIONS

This application claims the benefit of U.S. Provisional Application No. 60/085,347, filed May 13, 1998, the contents of which are incorporated herein by reference. This application is also related to U.S. application Ser. No. 09/199,480, entitled "Method and Apparatus for Variable Bit Rate Clock Recovery", filed Nov. 25, 1998, and now U.S. Pat. No. 6,285,722, Sep. 4, 2001, the contents of which are incorporated herein by reference.

BACKGROUND OF THE INVENTION

The present invention relates generally to optical networks and, more particularly, to a method and apparatus for automated time domain monitoring in optical networks.

Generally, digital transmission systems deliver information, which is encoded as quantized signals, from a sender to a receiver. There are several parameters that characterize the quality of the transmission in these systems. One such parameter is the "bit error ratio" or BER. BER can be measured at any point in a transmission system, and may be used for fault detection and isolation.

There are many effects that contribute to degradation of a measured BER. For example, signal attenuation reduces signal amplitude, dispersion alters pulse shape, receiver and amplifier noise increase signal level ambiguity, and jitter creates uncertainty in the sampling point and affects other aspects of synchronization.

In an optical network, such as a Wavelength Division Multiplexing (WDM) network, data passes through many different types of network elements: wavelength converters and filters, wavelength add-drop multiplexer (ADM), cross-connects, and optical amplifiers. The network elements may perform multiple optical to electronic (O/E) and electronic to optical (E/O) conversions, or alternatively, may process the data in optical form. Although it is preferable to perform signal monitoring at network elements that include O/E and E/O converters, one can also tap and detect a signal at any point in a WDM network.

FIG. 1 illustrates a prior art optical signal monitoring system 100, which monitors optical signals on a fiber link by performing indirect SNR or average power level measurement. As shown, optical monitoring system 100 includes an optical fiber 110 carrying an input optical signal, optical power splitter 120, optical fiber 130 carrying output optical signal, wavelength selective filter 140, photodetector 150, electrical amplifier 160, and a spectrum analyzer 170. An incident optical signal present in optical fiber 110 is conveyed to output fiber 130 via coupler 120.

To monitor the input optical signal, an optical tap in coupler 120 extracts a small amount of signal power from optical fiber 110. Wavelength selective filter 140 selects a desired wavelength, and photodetector 150 converts the light associated with the selected wavelength into an electrical signal. The current from photodetector 150 is amplified by electrical amplifier 160, and subsequently measured by spectrum analyzer 170, or alternatively, an average value meter.

One of the signal characteristics measured by spectrum analyzer 170 is an estimated signal-to-noise ratio (SNR), which is commonly used to characterize a link performance in a WDM network. Optical domain spectral monitoring is typically used to estimate the SNR in optical networks. The signal is spectrally narrow, typically a few GHz. Assuming that the noise is slowly varying with wavelength, the optical noise level is measured at a wavelength slightly away from the channel's signal, where the ratio of this noise to the optical signal represents the optical SNR.

Presently, an optical spectrum analyzer or an equivalent (e.g., a Hewlett Packard wavemeter) is used to measure the characteristics of an input optical signal in a WDM network. Such instruments, however, have a number of disadvantages. First, these instruments are expensive and slow (i.e., require scanning across all wavelengths). Second, there are well-known inaccuracies that result from such optical measurements. Third, some sources of signal noise are not detectable with these instruments. For example, interferometric intensity noise is one such source of signal noise, which is not detectable in the optical domain. Fourth, any induced jitter or wander cannot be detected using these instruments. Finally, the required optical SNR for low BER depends not only on the signal rate but also on the details of the receiver design.

Optical networks, such as WDM networks, can provide flexible broadband connectivity. A unique feature of WDM network technology is rate and format transparency. For example, the bit rate $f_{bit}$ of a signal may range from 25 Mb/s to 10 Gb/s. Furthermore, reconfigurable WDM networks perform highly variable route selection, a feature that is profoundly different from traditional point-to-point networks. At the periphery of such networks, any one set of users may employ at most a few line rates and formats. Within the network core, however, the full mix of rates and formats is encountered by most network elements. The route, line-rate, and format can be highly unpredictable and rapidly changing at any network element within a reconfigurable WDM network.

Like all other communication networks, it is desirable to monitor network transmission performance in WDM networks to anticipate problems before a user experiences poor service. Signal integrity and network link performance are closely monitored in traditional transmission systems, which operate at fixed line rates. These systems possess embedded signaling channels for diagnosis of transmission impairment and exchange of fault information.

For example, in Synchronous Optical Network (SONET) systems, the frame interval is continuously monitored along with verification of parity calculated on subsets of the bits within a frame. In these systems, loss of signal, loss of frame, and Bit Interleaved Parity 8 (BIP8) error rates are monitored and reported. Other transmission formats have their own embedded error detection.

Unlike traditional networks, however, WDM networks have less direct control over critical transmission parameters. Although many of the proposed WDM networks perform signal level management, they do not perform retiming, which is highly rate dependent and usually restrictive. When a WDM network performs little or no retiming, jitter management is delegated entirely to receivers at the user end. Accordingly, if the quality of the signal could be verified without full regeneration so that faults could be isolated to one subnetwork, it would facilitate implementation of multi-vendor interfaces for reconfigurable WDM networks.

Finally, interaction among protocol layers, such as locating faults when Internet Protocol (IP) routers or Asynchronous Transfer Mode (ATM) switches connect directly to optical networks, would be easier if a WDM network could dynamically determine the type of traffic it carries and test the quality of the traffic by checking for proper frame format and presence of errors. For example, when a network element in a WDM network detects an error in a signal, the network element could generate an alarm, facilitating the identification of the fault at the higher layer.

DESCRIPTION OF THE INVENTION

It is desirable to have a method and apparatus for performing automated time domain monitoring in optical networks that overcome the above and other disadvantages of the prior art. Methods and apparatuses consistent with the present invention determine characteristics of an input optical signal by estimating a minimum time interval between transitions in the input signal, determining a clock signal based on the estimated minimum time interval, and performing a time domain measurement on the input signal based on the determined clock signal.

In one embodiment, an optical signal monitoring apparatus comprises a forward rate detector, clock recovery circuit, and a time domain measurement circuit. The forward rate detector estimates the minimum time interval between transitions in an input optical signal. Based on the estimated minimum time interval, the clock recovery circuit extracts a clock signal from the input signal. Using the extracted clock signal, the time domain measurement circuit samples the input signal, and determines in time domain the characteristics of the input signal.

Methods and apparatuses consistent with the invention have several advantages over the prior art. In an optical network, many different time domain measurements may be performed on an optical signal once a clock is extracted. The clock is essential for measuring an eye-pattern, from which one can determine activity on a particular wavelength, directly calculate signal power levels and noise, and calculate jitter. With automated measurement, both instantaneous fault and average non-fault behavior may be used in fault isolation. The clock may be used to identify bit boundaries and to read the signal. Pattern detection may be used to recognize, for example, SONET A1A2 framing or the special symbols used in block coding. This would allow network elements to perform many of the conventional bit-level performance monitoring operations, even without benefit of information from network management.

One may determine the type of traffic present on a wavelength (if it is in a local catalog) and inform network management of the traffic type and quality. This would obviously be useful for preventing provisioning errors (by detecting that the traffic type present does not match the traffic expected) when jumpers are connected incorrectly. Also, this could provide a means for billing the customer, even though the customer has a transparent connection and can send a wide range of rates and types of traffic. It could also provide a near-real-time inventory of traffic statistics to network management. None of these things can be done today in the optical domain, and using inflexible fixed regeneration sacrifices transparency—the regeneration circuit would need to be changed whenever the traffic type or speed is changed.

When signals cross administrative boundaries, for example between a local exchange carrier (LEC) and an inter exchange carrier (IEC) or between a private network and an LEC, it is necessary to determine that the signal is not impaired before it leaves one network and enters another. Today, this requires full regeneration and well-defined single-wavelength interfaces, such as SONET OC-3 or electrical DS-1 or DS-3. As bandwidth demands grow, it is desirable to eliminate this regeneration and permit transparent, multi-wavelength access by measuring the quality of the signal.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 2:
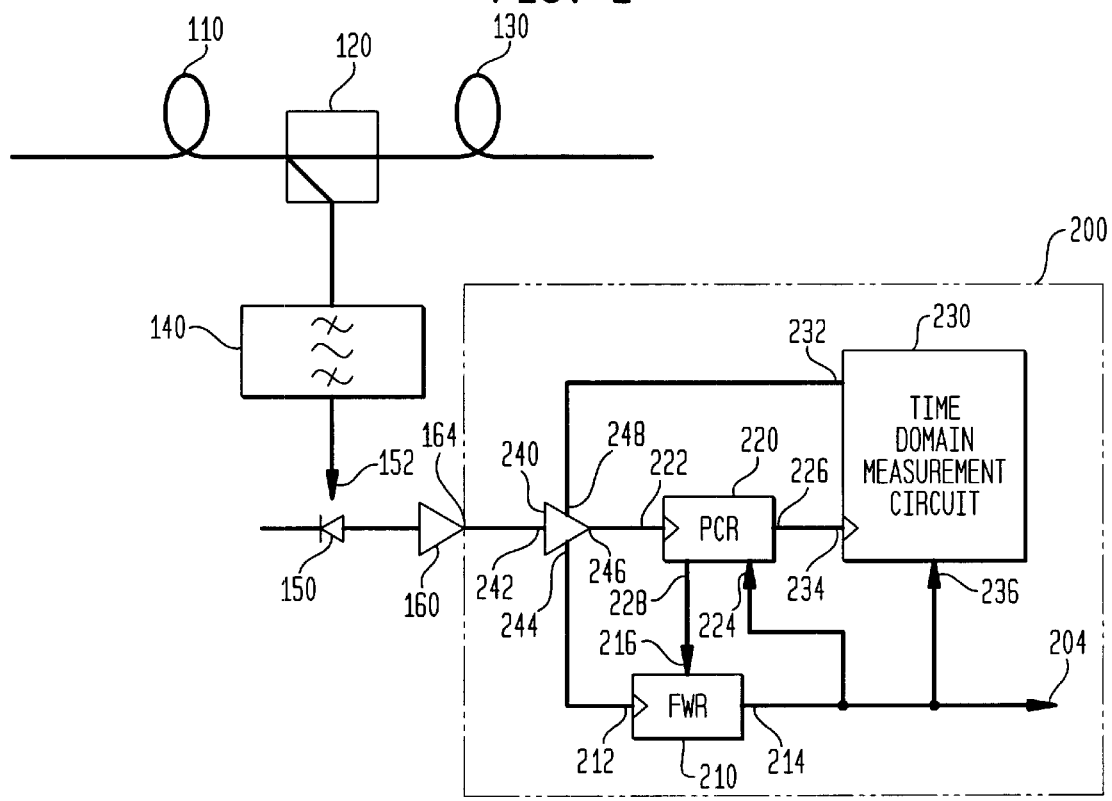
FIG. 2 illustrates a block diagram of a time domain optical signal monitoring apparatus, in accordance with an embodiment of the invention.

FIG. 2 illustrates a block diagram of a time domain optical signal monitoring apparatus 200, in accordance with an embodiment of the invention. Signal monitoring apparatus 200 comprises a forward rate detection and selection circuit (forward rate detector or FWR) 210, programmable clock recovery circuit (PCR) 220, time domain measurement circuit 230, and a buffer amplifier 240.

An optical signal sample 152 is incident on photodetector 150, which produces a current received by a transimpedance amplifier 160. An optical signal sample 152 is obtained via an optical power splitter 120 from an optical fiber 110 carrying an input optical signal using a wavelength selective filter 140.

Output 164 of amplifier 160 connects to input 242 of buffer amplifier 240. Buffer amplifier 240 includes three equivalent analog outputs 244, 246 and 248. Output 244 connects to input 212 of forward rate detector 210. Output 246 connects to input 222 of clock recovery circuit 220. Output 248 connects to analog input 232 of time domain measurement circuit 230. The signal at input 242 of buffer amplifier 240 is an analog representation of optical signal sample 152.

Optical signal sample 152 can be characterized by a bit-rate $f_{bit}$ when the optical signal sample 152 is a non-return-to-zero (NRZ) digital signal. Forward rate detector 210 produces a signal at output 214, which is an estimate of the bit-rate of the signal at input 242. In one embodiment, the signal at output 214 may be a digital representation of the estimated bit-rate.

Clock recovery circuit 220 includes a rate control input 224, which sets the particular frequency of operation in accordance with known techniques for clock recovery. Clock recovery circuit 220 generates a clock signal at output 226, which is synchronized with transitions in the signal at input 222 of clock recovery circuit 220 when rate control input 224 is set to a value that corresponds sufficiently close to $f_{bit}$. Rate control input 224 of clock recovery circuit receives a rate estimate signal from output 214 of forward rate detector 210.

As shown, clock recovery circuit 220 also includes a loss of lock signal output 228 that is active when clock output 226 is not synchronized to input 222. The signal at input 216 of forward rate detector 210 alters the algorithm used to determine the estimated bit rate of the signal applied to input 212. Different algorithms may be used depending on the current and past lock status of clock recovery circuit 220. In one embodiment, clock recovery circuit 220 may be implemented using known techniques for performing programmable clock recovery. Alternatively, clock recovery circuit 220 may be implemented in accordance with methods and apparatuses described in U.S. patent application Ser. No. 09/199,480, entitled "Method And Apparatus For Variable Bit Rate Clock Recovery."

Time domain measurement circuit 230 includes a clock input 234 and a rate input 236, which connect to output 226 of clock recovery circuit 220 and output 214 of forward rate detector 210, respectively. Using the clock signal at output 226 of clock recovery circuit 220, time domain measurement circuit 230 may perform waveform measurements on the analog signal at input 232. Time domain measurement circuit 230 may measure, for example, the eye-pattern in the optical signal sample 152, from which one can determine activity on a particular wavelength, directly calculate signal power levels and noise, and calculate jitter. Alternatively, time domain measurement circuit 230 may reconstruct the digital signal in optical signal sample 152 and subsequently assess particular characteristics of the digital signal.

Eye-pattern measurement is a time domain waveform measurement technique routinely employed to monitor and maintain digital transmission systems. The eye-pattern is an ensemble of average or superposition of pulse patterns corresponding to all different bit sequences. The ensemble may be obtained by sampling the signal waveform using a phase locked clock. The waveform can be characterized by the high and low mean signal levels $\mu_{hi}$ and $\mu_{lo}$, and the variance in these levels $\sigma_{hi}$ and $\sigma_{lo}$, respectively. The bit error rate (BER) of the signal can be accurately estimated from these eye-pattern parameters:

$$BER \geq \frac{1}{\sqrt{\pi}} \int_{Qopt/\sqrt{2}}^{\infty} e^{-u^2} du = \frac{1}{2} \mathrm{erfc}\left[\frac{Qopt}{\sqrt{2}}\right]$$

where $$Qopt \equiv \frac{\mu_{hi} - \mu_{lo}}{\sigma_{hi} + \sigma_{lo}}$$

In addition, jitter and wander can be assessed from the shape and variation of the transitions from low to high and vice versa. Eye-pattern measurements are an efficient diagnostic tool for assessing both slowly and rapidly changing transmission link performance. The eye-pattern provides a direct and consistent measure of signal parameters. An eye-pattern is especially important in WDM since the characteristics of the signal source and route may be highly variable.

The clock signal at output 226 of clock recover circuit 220 may be used to reconstruct the corresponding digital signal. Several measurements may be performed using the information contained in the recovered digital signal, depending on the transmission layer protocol. For example, byte alignment, framing, and error detection may be performed using a synchronized clock and knowledge of the bit rate. Pattern detection can be used to identify, for example, SONET A1A2 framing or the special symbols used in Gigabit Ethernet or Fiberchannel block coding. When the bit stream is associated with, for example, SONET, the error rate can be directly measured using the embedded Bit Interleaved Parity 8 (BIP8) bytes.

Furthermore, confirmation of bit synchronization may be used for rate reporting and as a criteria for usage billing. Additional monitoring functions could include determining source and destination address and cell or packet length and type. This information is useful for traffic monitoring and traffic characterization based on addressing and type as well as assessing network resource utilization.

Figure 3:
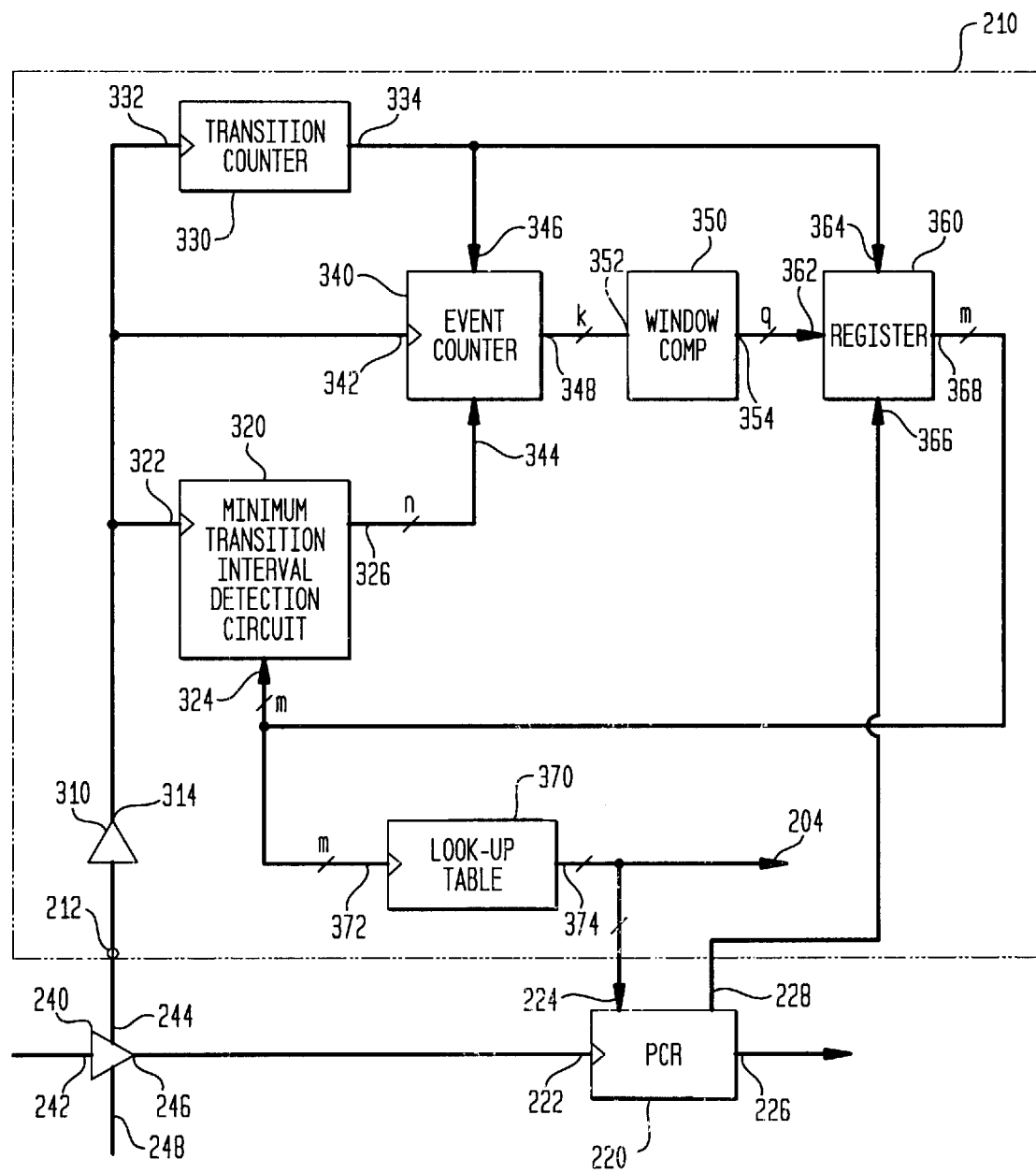
FIG. 3 illustrates a block diagram of a forward rate detector, in accordance with an embodiment of the invention.

FIG. 3 illustrates a block diagram of forward rate detector 210, in accordance with an embodiment of the invention. Alternatively, forward rate detector 210 may be implemented in accordance with methods and apparatuses described in U.S. patent application Ser. No. 09/199,480, entitled "Method And Apparatus For Variable Bit Rate Clock Recovery."

Forward rate detector 210 comprises a limiting amplifier 310, minimum transition interval detection circuit 320, transition counter 330, event rate counter 340, digital window comparator 350, successive approximation register 360, and a look-up table memory 370.

Forward rate detector 210 generates at output 204 a signal, which represents an estimate $f_{est}$ for the value of the bit-rate $f_{bit}$ of the signal applied at input 242. In one embodiment, the signal at output 204 has a binary weighted value that tracks the value of $f_{bit}$. In another embodiment, the signal at output 204 represents a set of one or more classifications of $f_{bit}$.

Minimum transition interval detection circuit 320 receives at input 322 an amplitude limited signal from amplifier 310 and at control signal input 324 a signal from register 360. The signal at control signal input 324 may, for example, include an m-bit wide digital word at lines $324_1$–$324_m$ (not shown), respectively. The signal at control input 324 programs n time reference intervals $\tau_{r\_1}$–$\tau_{r\_n}$. The signal at output 326 may, for example, include an n-bit wide digital word at lines $326_1$–$326_n$ (not shown), respectively Minimum transition interval detection circuit 320 compares the time between consecutive transitions, Δt, of the signal at input 322 with each of the programmed time reference intervals $\tau_{r\_1}$–$\tau_{r\_n}$. Each of the n output lines 326$_1$–326$_n$ corresponds to one of the n time interval comparisons. For each i=1, ..., n, output 326$_i$ may be high if Δt<$\tau_{r\_i}$ and may be low if Δt>$\tau_{r\_i}$. In particular, the probability that output 326$_i$ assumes a high value following consecutive transitions at input 322 is a monotonic function of the difference Δt–$\tau_{r\_i}$.

Transition counter 330 generates a pulse at output 334 after a prescribed number, $N_{i\_tran}$, of consecutive transitions have occurred at input 332, where $N_{i\_tran}$ is an integer with a value of, for example, 32.

Event rate counter 340 includes inputs 342, 344, and 346, which connect to output 314 of limiting amplifier 310, output 326 of minimum transition interval circuit 320, and output 334 of counter 330, respectively.

Event counter 340 generates a k-bit word at output 348, which includes lines 348$_1$–348$_k$, where the k-bit word depends on the number of times the output lines 326$_1$–326$_n$ of transition detector 320 are high following a level transition in input signal 342 during the time interval between consecutive pulses at input 346.

Window comparator 350 includes an input 352, which connects to output 348 of event counter 340. Window comparator 305 also includes an output 354, which includes q signals in lines 354$_1$–354$_q$ (not shown), respectively, where 2≦q≦n.

Register 360 includes inputs 362, 364, and 366, which connect to output 354 of window comparator 350, output 334 of counter 330, and loss of lock output 228, respectively. Register 360 also includes an output 368, which connects to input 324 of detector 320 and input 372 of look-up table memory 370. Output 374 of memory 370, which represents the signal at rate estimate output 204, connects to rate control input 224 of clock recovery circuit 220.

Forward rate detector 210 detects the bit-rate of optical signal sample 152 by estimating the minimum time interval between input signal transitions. Consecutive transitions of optical signal sample 152 can be assigned a time interval Δt$_i$. For a sufficiently large sample of transitions $N_{i\_tran}$, for example, $N_{i\_tran}$=32, the minimum value of the observed Δt$_i$ will be 1/$f_{bit}$, which may be represented as $$\min_{i=1, N_{i\_tran}} \Delta t = 1 / f_{bit}.$$

Minimum transition interval detection circuit 320 compares consecutive transition intervals against one or more reference time intervals. Event counter 340 and window comparator 350 classify the rate of responses from the interval comparisons present at output 326 of transition detector 320. The estimated bit rate is classified according to its relationship with the rates 1/$\tau_{r\_i}$ corresponding to the reference time intervals $\tau_{r\_i}$.

Forward rate detector 210 may estimate the bit-rate of optical signal sample 152 with m-bit resolution or may distinguish the bit-rate within a particular set of q+1 rate categories. The two modes may be used simultaneously. For high resolution bit-rate tracking, one or more references intervals $\tau_{r\_i}$ are adjusted by register 360 via output 368 as a result of the classification process performed by event counter 340 and window comparator 350 such that one or more reference intervals $\tau_{r\_i}$ match the minimum of Δt$_i$.

For rapid rate classification, one or more sets of reference time intervals are selected for which the corresponding rates 1/$\tau_{r\_i}$ lie between the bit-rates of interest in optical signal sample 152. The classification process performed by event counter 340 and window comparator 350, in addition to interval assignment by register 360, determines which reference interval most likely includes the bit rate of optical signal sample 152. Register 360 may instruct detector 320 to use different sets of reference time intervals if clock recovery circuit 220 fails to achieve clock acquisition.

In one embodiment of the invention, precise rate measurements may be made with, for example, n=2, m=10, and q=2. $\tau_{r\_1}$=$\tau_{r\_2}$ may have a value that is monotonically related to the binary weighted value of the word represented by the collection of inputs lines 324$_1$–324$_m$. The monotonic relation may, for example, be linear or semi-logarithmic.

Event counter 340 assigns to output lines 348$_1$–348$_k$ a binary weighted value corresponding to the total number of times output lines 326$_1$–326$_n$ were individually high following a level transition at input 342 during the time interval between consecutive pulses applied to input 346 of event counter 340.

Window comparator 350 compares the binary weighted value at input 352 against a predetermined high value $N_{hi}$ and a predetermined low value $N_{lo}$. Output line 354$_1$ is high if $N_{hi}$ is smaller than the value at input 352, and output line 354$_2$ is high if $N_{lo}$ is greater than the value at input 352.

Register 360 may be an m stage binary up-down counter whose count direction (hold, up or down) may be controlled by outputs 354$_1$ and 354$_2$, which connect to inputs 362$_1$ and 362$_2$, respectively. Depending on the number of pulses appearing at input 364 of register 360 during the time which input 366 may be at a high state, representing prolonged loss of lock by clock recovery circuit 220, the register may count by increments of, for example, 0 or ±1 or by progressive steps of binary weight value of, for example, 0 or $2^{n-step}$ with n step=m, m–1, ..., 0.

Look up table 370 maps the m-bit word at output 368 into a bit-rate estimate signal 204 with a prescribed representation. Look-up table 370 may use, for example, a known transfer function relating the control input 324 and the response bit-rate $f_{bit}$, which may include a correction for known temperature dependencies, to convert the m-bit digital word at output 368 into the binary coded decimal word representing the estimated bit-rate.

In another embodiment, particular sets of rates may be rapidly distinguished by setting, for example, n=4, q=n, m=q+4, and k to a multiple of n. Accordingly, control input lines 324$_1$–324$_3$ may select one of eight predetermined values for each of $\tau_{r\_1}$, $\tau_{r\_2}$, $\tau_{r\_3}$ and $\tau_{r\_4}$.

Each set of k/n output lines 348$_1$–348$_k$ includes a binary weighted value equal to the total number of times the corresponding input 326$_i$, for i=1, ..., n, is high following transitions in the signal at input 342 during the time interval between consecutive pulses at input 346.

Each of output lines 354$_1$–354$_q$ corresponds to a k/n subset of inputs such that an output lines 354$_i$ is high if the word represented by the corresponding k/n bits includes a binary weighted value that exceeds a predetermined value $N_{hi}$.

Register 360 may include a q input priority encoded with q+1 outputs, q+1 latches enabled by pulses applied to input 360, and an m–q–1=3 bit binary counter.

Look-up table 370 may assign the appropriate rate to the m-bit digital word at output 368, which connects to input 324 of minimum transition interval detection circuit 320 and input 372 of look-up table 370. Look-up table 370 may, for example, include an m×r memory. The memory output locations may include r-bit representations of the rates corresponding to references time intervals selected by the control signal at control input 324.

Figure 4:
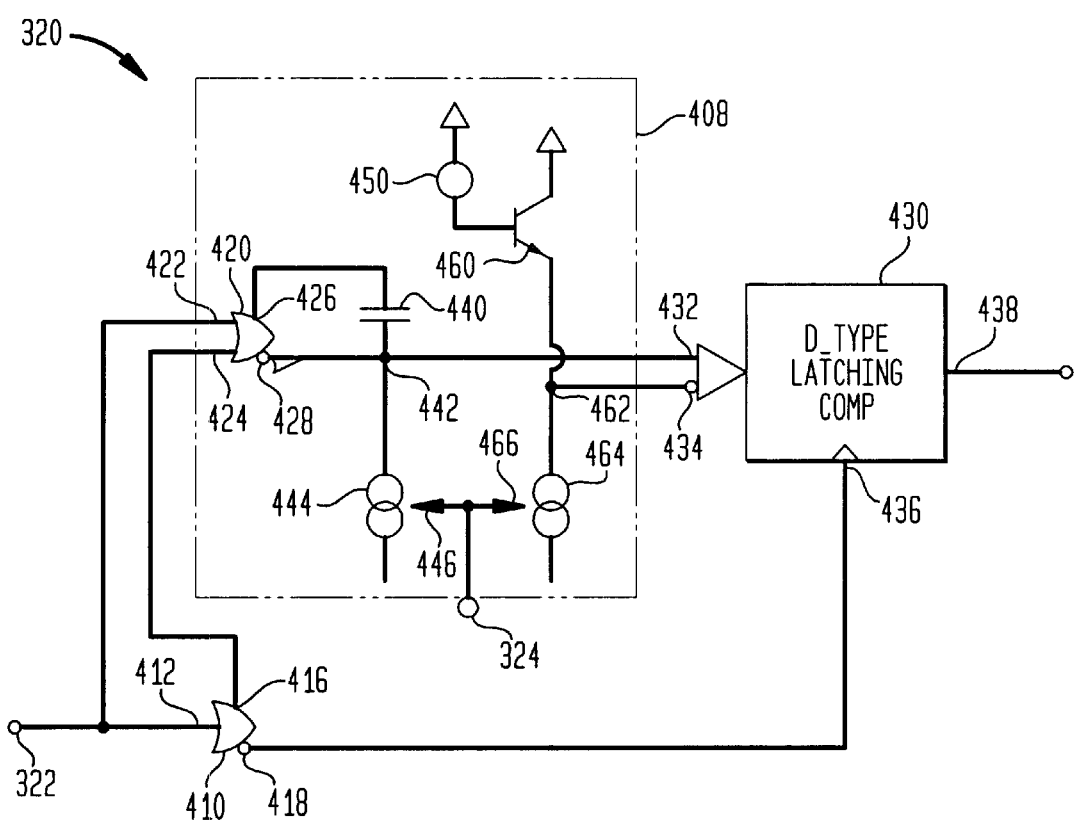
FIG. 4 illustrates an emitter coupled logic (ECL) implementation of a minimum transition interval detection circuit, which uses pulse-width auto-correlations responsive to rising edge transitions, in accordance with an embodiment of the invention.

FIG. 4 illustrates an emitter coupled logic (ECL) implementation of minimum transition interval detection circuit 320, which uses pulse-width auto-correlations responsive to rising edge transitions, in accordance with an embodiment of the invention. Minimum transition interval detection circuit 320 comprises an input 322, control input 324, output 326, ECL gate 410 D-type latching comparator 430, and a programmable delay element 408. Programmable delay element 408 includes an ECL OR/NOR gate 420, capacitor 440, voltage reference 450, transistor 460, and programmable current sources 444 and 464.

Input 322 connects to inputs 412 and 422 of gate 410 and OR/NOR gate 420, respectively. Non-inverting output 416 of gate 410 connects to second input 424 of OR/NOR gate 420. Inverting output 418 of gate 410 drives clock input 436 of latching comparator 430. Gate 420 includes a non-inverting output 426 and an inverting output 428. Output 428 is an open-emitter, allowing gate 420 to perform a current gating function. Capacitor 440 connects to output 426 and node 442.

Node 442 connects to open-emitter output 428 and controlled current source 444. Capacitor 440 is charged by current from output 428 and is discharged at a controlled rate by the current $I_{444}$ from source 444. Non-inverting data input 432 of latched comparator 430 senses the voltage at node 442.

Reference voltage 450 connects to the base of transistor 460 whose emitter is connected to node 462. Controlled current source 464 also connects to node 462. Current sources 444 and 464 include control inputs 446 and 466, respectively, which are both connected to control input 324. Inverting data input 434 of latched comparator 430 senses the voltage on node 462.

Comparator 430 senses the voltage difference between inputs 432 and 434 when clock input 436 is low. Output 438 of latching comparator 430 is updated on the rising edge transition of enable input 436. Latching comparator 430 may, for example, be a D-type flip flop with differential data inputs. Detector output 326 connects to output 438 of latching comparator 430.

In the embodiment of FIG. 4, minimum transition interval detection circuit 320 responds to a rising edge transition of the digital signal applied to input 322 and determines whether the subsequent falling edge transition occurs before or after a programmable reference time interval $\tau_r$ has elapsed. In an alternative embodiment, multiple minimum transition interval detection circuit 320 connected in parallel may each receive a replica of the signal at input 322 with opposing polarity, and may subsequently measure the minimum transition interval associated with both rising and falling edge transitions.

The quiescent state of minimum transition interval detection circuit 320 is defined when input 322 is low. In the quiescent state, gate output 418 is high and output 416 is low. When input 322 and output 416 are low, gate output 426 is low and output 428 is high. Output 428 conducts most of the current from source 444. The voltage across capacitor $C_{440}$ in the quiescent state is the difference between $V_{428}^{hi}$ at output 428, for example −0.8V, and $V_{426}^{low}$ at output 426, for example −1.8V.

A reference voltage $V_{462}$ is created at node 462 by voltage reference 450, transistor 460, and current source 464. The reference voltage may be chosen to be lower than the quiescent voltage at output 428, for example −1.5V. The quiescent voltage at output 428 may be altered by changes in current $I_{444}$ flowing into current source 444. Current sources 444 and 464 have related outputs through their common control via inputs 324. The change in the quiescent voltage at output 428, which is associated with the current through source 444, may be matched by the change in voltage at node 462 associated with current source 464. Comparator 430 is not responsive to the like current dependent offsets applied simultaneously to differential inputs 432 and 434.

Gate 420 and gate 410 respond when input signal 322 transitions from low to high after a gate propagation delay, output 416 and output 426 transition from low to high, output 418 transitions from high to low, and output 428 ceases to conduct current from source 444. The positive transition at output 426 to $V_{426}^{hi}$ drives node 442 high, while the current from source 444 causes the voltage at node 442 subsequently decrease with time. The voltage at node 442 will equal the voltage at node 462 after period $\tau_r$, has elapsed, and may be represented as follows:

$$I_{444}\tau_r = C_{440}(V_{428}^{hi} + V_{426}^{hi} - V_{426}^{low} - V_{462}) - Q_{428},$$

where $Q_{428}$ is the charge absorbed by output 428 as it goes inactive.

Gate 410 responds to a subsequent high-to-low transition of input 322 and after a gate propagation delay, output 416 transitions high to low, and output 418 transitions low to high. The low-to-high transition at output 418 activates comparator clock input 436. If clock input 436 transitions from high to low before $\tau_r$ has elapsed, output 438 will be high. Otherwise, output 438 will be low. A high level at output 438 indicates $1/f_{bit} < \tau_r$.

Gate 420 responds to the high-to-low transition of output 416, two gate delays following the high-to-low transition of input 322, with output 428 becoming active and raising the voltage at node 442 to $V_{428}^{hi}$ while output 426 goes low. The connection of output 416 to input 424 delays the response of gate 420 to falling edge input transitions so as not to disturb the voltage at node 442 while comparator 430 is being latched.

Figure 5A:
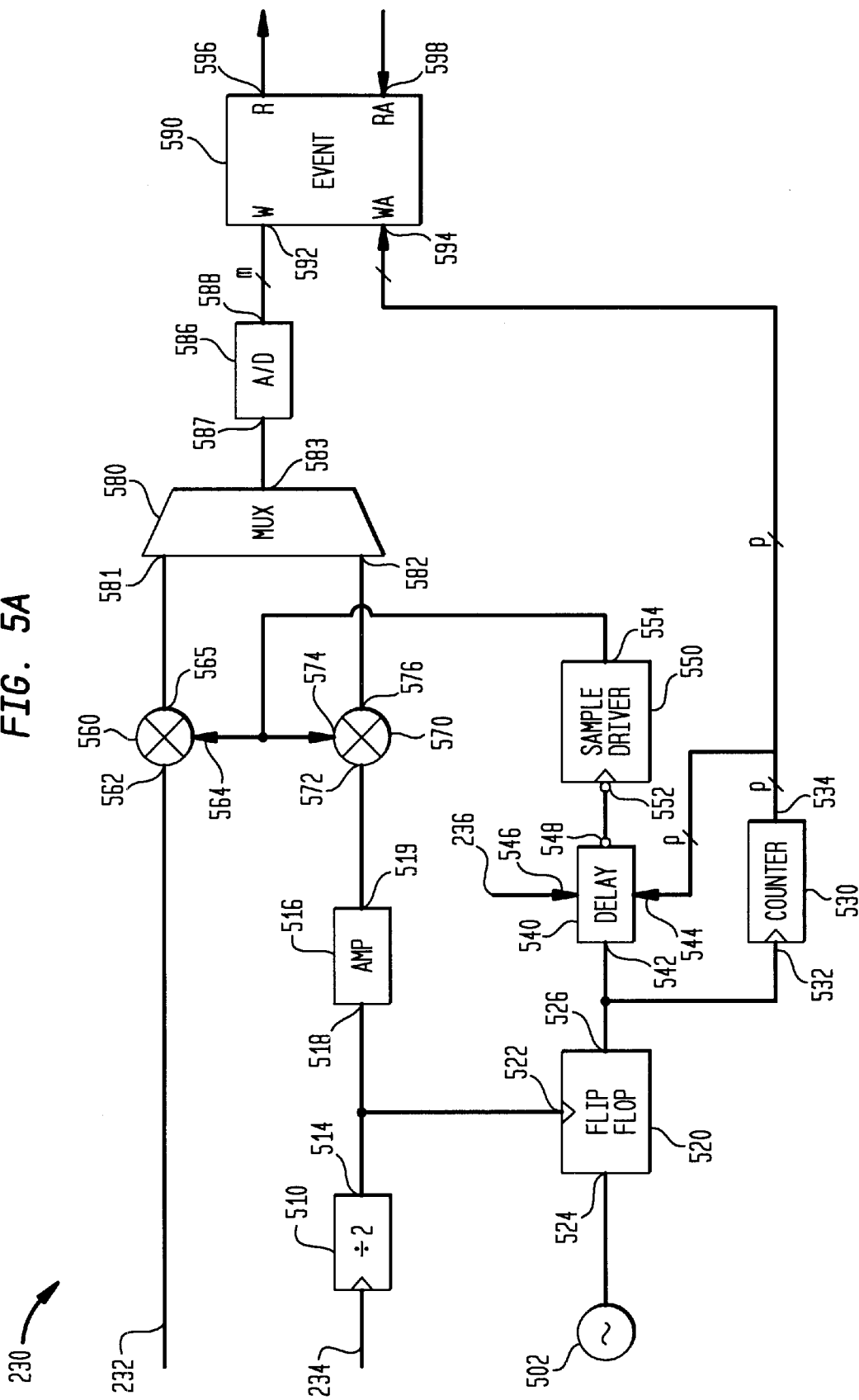
FIG. 5a illustrates a block diagram of a time domain measurement circuit, which performs self-calibrating waveform measurement suitable for network monitoring applications, in accordance with an embodiment of the invention.

FIG. 5a illustrates a block diagram of time domain measurement circuit 230, which performs self-calibrating waveform measurement suitable for network monitoring applications, in accordance with an embodiment of the invention. Measurement circuit 230 includes an analog input 232, recovered clock input 234, sampling rate clock 502, clock divide-by-2 circuit 510, limiting amplifier 516, D-type flip-flop 520, counter 530, programmable delay generator 540, sampler driver 550, sampling circuits 560 and 570, two channel analog multiplexer 580, analog-to-digital (A/D) converter 586, and an event accumulator 590. Clock divide-by-2 circuit 510, limiting amplifier 516, D-type flip-flop 520, sampling circuit 570, and input 234 constitute a time base auto-calibration circuit.

The analog signal at input 232, which connects to output 248 of buffer amplifier 240, is a replica of optical signal sample 152. Sampler 560 includes input 562, which connects to input 232. Since input 234 connects to clock recovery circuit 220, the clock signal at input 234 is synchronous with transitions in the signal at input 232.

Clock divide-by-2 circuit 510 includes an output 514, which connects to input 522 of D-type flip-flop 520 and input 518 of limiting amplifier 516. The signal at output 514 is a square wave pulse train with transitions at $1/f_{bit}$ intervals synchronized with the signal at input 234. The signal at output 514 may be used, for example, to perform time base calibration.

Limiting amplifier 516 includes an output 519, which connects to an input 572 of sampler 570. The amplitude of the signal at output 519 may include a predetermined value, making the signal useful for amplitude calibration purposes.

D-type flip-flop 520 includes an input 524, which connects to a sampling rate clock 502, and an output 526, which connects to input 532 of counter 530 and input 542 of programmable delay generator 540. The rate of the waveform sampling process may be controlled by clock 502.

Counter 530 includes a digital output 534, which connects to delay control input 544 and write address input 594 of event accumulator 590. Pulse output 548 connects to trigger input 552 of sampler driver 550. Sampler driver 550 produces a very short pulse at output 554 in response to a falling edge transition applied to input 552.

Programmable delay generator 540 includes a trigger input 542, delay control input 544, rate range input 546, and a pulse output 548. Programmable delay 540 generates a delayed falling edge pulse at output 548 in response to a rising edge transition at input 542. The falling edge at output 548 is delayed by a period of time $\tau_{OS}$, which is determined by delay control input 544 and rate range input 546. The delay period $\tau_{OS}$ is coarsely tuned by input 546 and finely tuned by input 544. Rate range input 546 receives a rate estimate signal at input 236.

Sampler 560 includes a gating input 564 and output 566. Sampler 570 includes a gating input 574 and output 576. Gating inputs 564 and 574 both connect to sampler driver output 554. A short pulse applied to gating inputs 564 and 574 cause samplers to transiently measure the voltage appearing at their respective inputs 562 and 572.

Samplers 560 and 570 include signal outputs 566 and 576, respectively, which are connected to inputs 581 and 582, respectively, of analog multiplexer 580. Analog multiplexer 580 holds the voltage level applied to inputs 581 and 582, and alternately presents these voltages to A/D converter 586. Digital output 588 from A/D converter 586 is received by write input 592.

Event accumulator 590 includes a write input 592, write address 594, read output 596, and a read address input 598. Event accumulator 590 receives at input 592 m-bit digital words from A/D converter 586 corresponding to voltage levels on inputs 581 and 582. Event accumulator 590 receives at input 594 p-bit digital words corresponding to the delay applied to the trigger pulse, which initiated acquisition of the waveform samples appearing as voltage levels at inputs 581 and 582.

Event accumulator 590 performs an auto-regressive average of the number of times a particular word appears at input 592 coincident with another particular word at input 594. Event accumulator 590 may, for example, comprise an m×p×q random access memory and an arithmetic logic unit. It will be recognized that the contents of the registers in accumulator 590 constitute a histogram of voltage levels as a function of delay time for both the analog signal at input 232 and the square wave signal at output 519. The set of histograms for the analog signal at input 232 constitute an eye-diagram for the measured waveform. The set of histograms for the square wave signal at output 519 constitute a measured calibration waveform. The two histogram arrays, one for the eye-pattern and one for the calibration waveform, may be accessed at output 596 via addressing by read address input 598.

Figure 5B:
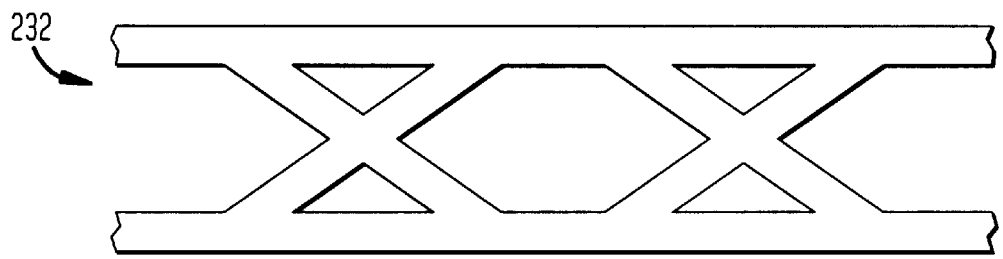
FIGS. 5b, 5c, and 5d illustrate an eye-pattern for a signal at an input of a time domain measurement circuit, a synchronized calibration waveform, and a sampling pulse, respectively, in accordance with an embodiment of invention.
Figure 5C:
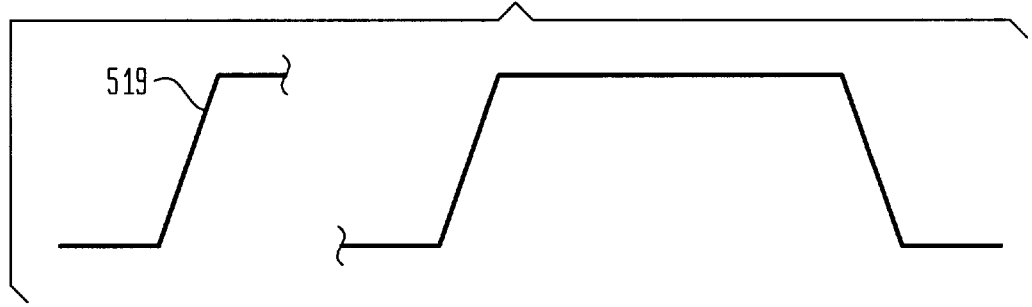
Figure 5D:
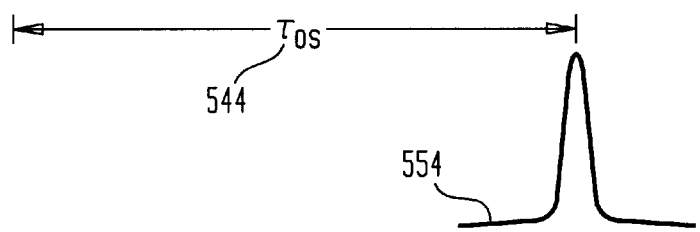

FIG. 5b illustrates an eye-pattern for the analog signal at input 232 of time domain measurement circuit 230. FIG. 5c illustrates the square wave calibration signal at output 519 of limiting amplifier 516. A rising edge transition associated with the triggering of sampler driver 550 is shown. FIG. 5d illustrate the sampling pulse at output 554 of sampler driver 550. As shown, the sampling pulse at output 554 is delayed by time $\tau_{OS}$.

The sampling pulse at output 554 is finely stepped across the measured waveform. The period of the measured waveform may vary from 100 psec to 100 nsec, requiring different size steps for $\tau_{OS}$. The step size of $\tau_{OS}$ is represented by a controlled rate signal at input 546 to programmable delay generator 540. The estimated rate signal at input 236 provides the necessary information to automatically chose the appropriate set size for $\tau_{OS}$.

Eye-pattern measurements require accurate correlation of amplitude and time. To produce a delay $\tau_{OS}$ that has low jitter and a precisely controlled value, more complex circuits known in the art may be used to achieve both accuracy and low jitter. Complex circuits, however, may not be appropriate for performing automated waveform measurement in WDM networks.

Accordingly, programmable delay generator 540 may comprise, for example, delay element 408 shown in FIG. 4, which is simple, has low jitter, and has a monotonic response to the control currents. Measurement of calibration signal 519 performed simultaneously with measurement of the analog signal at input 232 provides an internal time reference for calibrating the delay $\tau_{OS}$. In one embodiment, the time values associated with the waveform voltage samples may be calculated by interpolating the time values assigned to measured transitions in calibration waveform 519.

Figure 6:
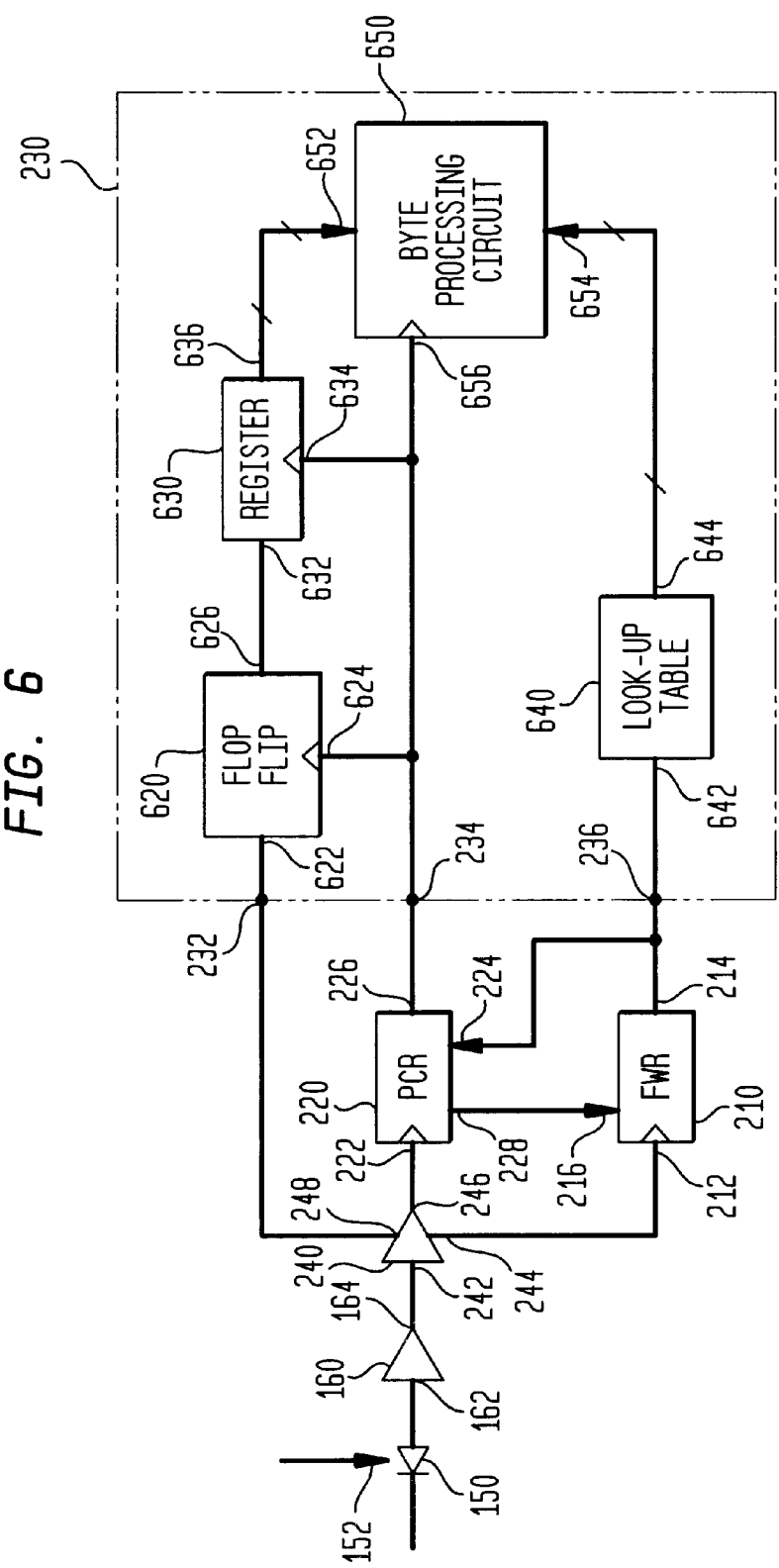
FIG. 6 illustrates a block diagram of a time domain measurement circuit, in accordance with an embodiment of the invention.

FIG. 6 illustrates a block diagram of time domain measurement circuit 230, in accordance with an embodiment of the invention. Measurement circuit 230 comprises a decision flip-flop 620, shift register 630, rate-addressed look-up table 640, and byte-processing circuit 650.

Decision flip-flop 620 includes an analog input 622, clock input 624, and a digital output 626. Shift register 630 includes a serial input 632, clock input 634, and a parallel data output 636. Lookup table 640 includes a rate estimate input 642 and a data field descriptor output 644. Byte-processing circuit 650 includes a parallel data input 652, data field descriptor input 654, and a clock input 656.

Figure 1:
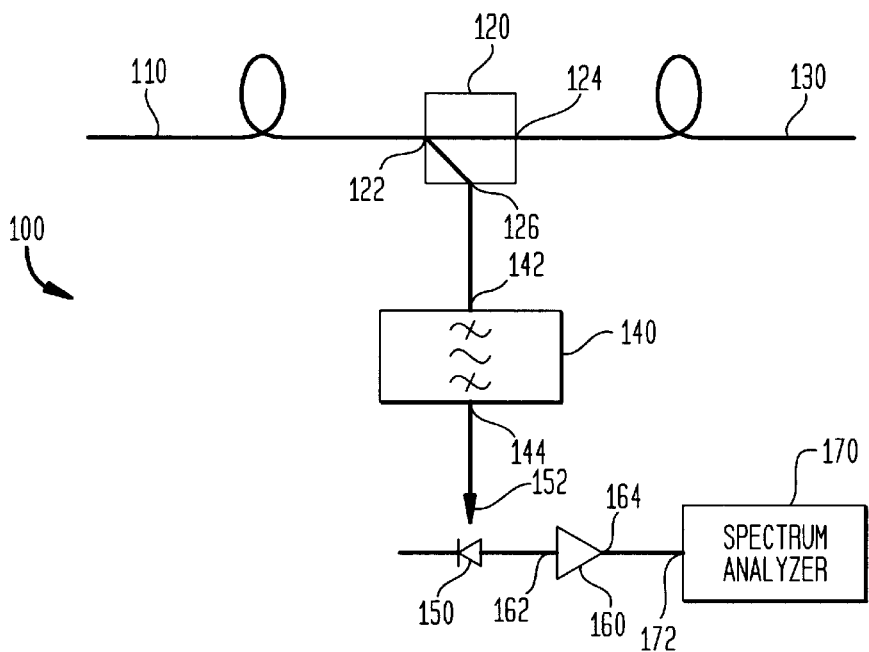
FIG. 1 illustrates a block diagram of a prior art optical signal monitoring system.

Optical signal sample 152 may be an optical sampling means as shown in FIG. 1. Alternatively, optical signal sample 152 may be obtained from an optical fiber used for accessing an optical network. As shown in FIG. 6, light from optical signal sample 152 is incident on photodetector 150 whose current output is received by input 162 of electrical amplifier 160. Output 164 of amplifier 160 connects to input 242 of buffer amplifier 240, which generates three replicas of input signal 242 at outputs 244, 246, and 248.

Output 244 connects to input 212 of forward rate detector 210. Output 246 connects to input 222 of clock recovery 220. Output 248 connects to analog input 622 of decision flip-flop 620. Rate control input 224 of clock recovery circuit 220 connects to rate estimate output 214 of forward rate detector 210. Forward rate detector 210 rapidly estimates the bit-rate of input signal 152. The rate estimate signal at input 214 sets rate control input 224 of clock recovery circuit 220 so that clock recovery circuit 220 can appropriately respond to the bit-rate of input signal 152.

When forward rate detector 210 is implemented as a discrete rate detector, the step of rate estimation may be accomplished within, for example, 8 to 32 signal transitions following the onset of input signal 152. Rate detector 210 accepts control input 216 from loss of lock output 228 of clock recovery circuit 220. Recovered clock output 226 connects to clock inputs 624 and 634 of decision circuit 620 and shift register 630, respectively. Output 226 also connects to clock input 656.

Decision flip-flop 620 converts the analog signal at input 622 into a re-timed digital bit-stream at output 626. Shift register 630 converts the serial bit stream into a set of time shifted bit streams.

Look-up table 640 receives at input 642 the estimated rate output 214. Different rate specific information may be stored in look-up table 640, including, for example, byte alignment bit patterns, frame alignment bit-patterns, location of address data, location of error detection data, location of error correction data, and location cell or packet description data. The desired rate specific bit patterns and locations may be provided at output 644.

There are several additional time domain measurements, which may be performed with the recovered clock at output 226 in addition to error detection as previously mentioned. For example, the clock may be used to recover the bit stream so that appropriate computations, such as BIP8, may be performed. Confirmation of bit synchronization may be used for rate reporting and as criteria for usage billing. Other bit level functions may include traffic monitoring and traffic characterization based on addressing and type as well as assessing network resource utilization.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for determining time domain characteristics of a monitored input signal from an optical network comprising the steps of:
    estimating a minimum time interval between consecutive transitions in the input signal;
    determining a variable bit rate of the input signal based on the estimated minimum time interval;
    recovering the input signal's clock signal based on the determined bit rate; and
    performing a time domain measurement on the input signal based on the determined bit rate and the recovered clock signal.

2. A method for determining time domain characteristics of a monitored input signal from an optical network comprising the steps of:
    estimating a minimum time interval between transitions in the input signal;
    determining a variable bit rate of the input signal based on the estimated minimum time interval;
    recovering the input signal's clock signal based on the determined bit rate; and
    performing a time domain measurement on the input signal based on the recovered clock signal, said performing step including the step of reconstructing a digital signal from the monitored input signal by sampling the input signal based on the recovered clock signal.

3. The method of claim 2, wherein the reconstructing step includes the step of:
    sampling one or more bit intervals in the input signal.

4. The method of claim 2, wherein the reconstructing step includes the step of:
    sampling the input signal at a midpoint of a bit interval in the input signal.

5. The method of claim 1, wherein the performing step includes the steps of:
    determining a rate specific signal characteristic of the input signal based on the determined bit rate; and
    measuring the input signal based on the rate specific signal characteristic.

6. The method of claim 5, wherein the step of determining the rate specific signal characteristic includes the step of:
    determining a byte alignment bit pattern associated with the input signal based on the determined bit rate.

7. The method of claim 5, wherein the step of determining the rate specific signal characteristic includes the step of:
    determining a frame alignment bit pattern associated with the input signal based on the determined bit rate.

8. The method of claim 5, wherein the step of determining the rate specific signal characteristic includes the step of:
    determining location of address data associated with the input signal based on the determined bit rate.

9. The method of claim 5, wherein the step of determining the rate specific signal characteristic includes the step of:
    determining location of error detection data associated with the signal input based on the determined bit rate.

10. The method of claim 5, wherein the step of determining the rate specific signal characteristic includes the step of:
    determining location of error correction data associated with the input signal based on the determined bit rate.

11. The method of claim 5, wherein the step of determining the rate specific signal characteristic includes the step of:
    determining location of packet descriptive data associated with the input signal based on the determined bit rate.

12. The method of claim 5, wherein the step of determining the rate specific signal characteristic includes the step of:
    determining location of cell description data with the input signal based on the determined bit rate.

13. The method of claim 1, wherein the performing step includes the step of:
    identifying a protocol associated with the input signal based on the determined bit rate.

14. The method of claim 1, wherein the performing step includes the step of:
    determining a location of information associated with the input signal based on the determined bit rate.

15. The method of claim 14, wherein the step of determining the location includes the step of:
    extracting the information at the determined location in the input signal.

16. A method for determining time domain characteristics of a monitored input signal from an optical network comprising the steps of:
    estimating a minimum time interval between transitions in the input signal;
    determining a variable bit rate of the input signal based on the estimated minimum time interval;
    recovering the input signal's clock signal based on the determined bit rate; and
    performing a time domain measurement on the input signal based on the recovered clock signal, the performing step including the steps of:

sampling the recovered clock signal and the input signal at a plurality of times to generate a clock signal histogram and an input signal histogram; and using the clock signal histogram to calibrate the timing sequence of the sampled input signal histogram.

17. A method for determining time domain characteristics of a monitored input signal from an optical network comprising the steps of:

estimating a minimum time interval between transitions in the input signal;

determining a variable bit rate of the input signal based on the estimated minimum time interval;

recovering the input signal's clock signal based on the determined bit rate; and performing a time domain measurement on the input signal based on the recovered clock signal, the performing step including the steps of:

sampling the recovered clock signal and the input signal at a plurality of times to generate a clock signal histogram and an input signal histogram; and using the clock signal histogram to calibrate the amplitude of the sampled input signal histogram.

18. The method of claim 1, wherein the estimating step includes the step of:

determining a variable bit rate of the input signal based on the estimated minimum time interval.

19. A method for determining time domain characteristics of a monitored input signal from an optical network comprising the steps of:

estimating a minimum time interval between transitions in the input signal;

determining a variable bit rate of the input signal based on the estimated time interval;

recovering the input signal's clock signal based on the determined bit rate; and performing a time domain measurement on the input signal based on the recovered clock signal, and wherein the estimating step includes the steps of:

generating a plurality of test pulses that correlate to the transitions in the input signal; and adjusting the duration of each of the plurality of test pulses such that the minimum time intervals between the transitions in the input signal match the durations of the corresponding plurality of pulses.

20. A method for determining characteristics of an input signal comprising the steps of:

estimating a minimum time interval between transitions in the input signal;

determining a clock signal based on the estimated minimum time interval; and performing a time domain measurement on the input signal based on the determined clock signal;

wherein the estimating step includes the steps of:

generating a set of delayed input signals using a set of programmable delay times, respectively;

comparing the transitions in the input signal with the set of delayed input signals; and identifying the nearest predetermined delay times that are before and after the minimum transition time interval between the transitions in the input signal.

21. The method of claim 20, wherein the generating step includes the step of:

resetting one or more of the programmable delay elements after the comparing step.

22. A method for determining characteristics of an input signal comprising the steps of:

estimating a minimum time interval between transitions in the input signal;

determining a clock signal based on the estimated minimum time interval; and performing a time domain measurement on the input signal based on the determined clock signal;

wherein the estimating step includes the steps of:

generating a set of delayed input signals using a set of programmable delay elements delaying the input signal based on a set of predetermined delay times, respectively;

comparing the transitions in the input signal with the set of delayed input signals; and adjusting one or more of the programmable delay elements, such that minimum time intervals between the transitions in the input signal match one or more of the set of predetermined delay times.

23. The method of claim 22, wherein the generating step includes the step of:

resetting one or more of the programmable delay elements after the comparing step.

24. An apparatus for determining time domain characteristics of a monitored input signal from an optical network comprising:

a forward rate detector that determines the input signal's bit rate by measuring the minimum time interval between consecutive transitions in the input signal, said forward rate detector including a transition detector and line rate estimation circuitry;

a clock recovery circuit that recovers the input signal's clock signal based on the determined bit rate; and a measurement circuit that performs a time domain measurement on the input signal based on the recovered clock signal.

25. An apparatus for determining the time domain characteristics of a monitored input signal from an optical network comprising:

a forward rate detector that determines the input signal's bit rate by estimating a minimum time interval between transitions in the input signal;

a clock recovery circuit that recovers the input signal's clock signal based on the determined bit rate; and a measurement circuit that performs a time domain measurement on the input signal based on the recovered clock signal, the measuring circuit comprising:

a delay generator that generates a first pulse synchronized to the recovered clock signal;

a sampler driver that generates a second pulse in response to the first pulse; and a first sampler that measures a plurality of instantaneous values of the input signal gated by the second pulse in order to generate a histogram of the input signal.

26. An apparatus for determining time domain characteristics of a monitored input signal from an optical network comprising:

a forward rate detector that determines the input signal's bit rate by estimating a minimum time interval between transitions in the input signal;

a clock recovery circuit that recovers the input signal's clock signal based on the determined bit rate; and a measurement circuit that performs a time domain measurement on the input signal based on the recovered clock signal, the measurement circuit comprising:
a decision circuit that reconstructs a digital signal from the monitored input signal by sampling the input signal based on the recovered clock signal.

27. The apparatus of claim 26, wherein the measurement circuit further comprises:
a converter that generates a stream based on the sampled input signal;
a storage device storing a set of rate specific signal characteristics that are referenced based on the determined bit rate; and
a processing circuit that measures the stream based on the set of rate specific signal characteristics.

28. The apparatus of claim 27, wherein the set of signal characteristics include a byte alignment bit pattern.

29. The apparatus of claim 27, wherein the set of signal characteristics include a frame alignment bit pattern.

30. The apparatus of claim 27, wherein the set of signal characteristics include location of address data.

31. The apparatus of claim 27, wherein the set of signal characteristics include location of error detection data.

32. The apparatus of claim 27, wherein the set of signal characteristics include location of error correction data.

33. The apparatus of claim 27, wherein the set of signal characteristics include packet description data.

34. The apparatus of claim 27, wherein the set of signal characteristics include cell description data.

35. An apparatus for determining the time domain characteristics of a monitored input signal from an optical network comprising:
a forward rate detector that determines the input signal's bit rate by estimating a minimum time interval between transitions in the input signal;
a clock recovery circuit that recovers the input signal's clock signal based on the determined bit rate; and
a measurement circuit that performs a time domain measurement on the input signal based on the recovered clock signal, the measurement circuit comprising a storage device storing a location of data associated with the input signal wherein the storage device is referenced based on the determined bit rate.

36. The apparatus of claim 35, wherein the measurement circuit further comprises:
a processing circuit that extracts information from the input signal based on the location data.

37. An apparatus for determining time domain characteristics of a monitored input signal from an optical network comprising:
a forward rate detector that determines the input signal's clock signal based on the determined bit rate; and
a measurement circuit that performs a time domain measurement on the input signal based on the recovered clock signal, the measurement circuit comprising:
a delay generator that generates a first pulse synchronized to the recovered clock signal;
a sampler drive that generates a second pulse in response to the first pulse;
a first sampler that measures a plurality of instantaneous values of the input signal gated by the second pulse to generate an input signal histogram; and
a second sampler that measures a plurality of instantaneous values of the recovered clock signal gated by the second pulse to generate a clock signal histogram used to calibrate the input signal histogram.

38. An apparatus comprising:
a forward rate detector that estimates a minimum time interval between transitions in an input signal;
a clock recovery circuit that determines a clock signal based on the estimated minimum time intervals; and
a measurement circuit that performs a time domain measurement on the input signal based on the determined clock signal;
wherein the forward rate detector comprises a minimum transition interval detection circuit that compares time intervals between consecutive transitions in the input signal with one or more reference intervals, the minimum transition interval detection circuit comprising:
a delay element that delays a first transition in the input signal by a first predetermined delay time and delays a second transition in the input signal by a second predetermined delay time; and
a comparator that compares the delayed first transition with the second transition.

39. An apparatus comprising:
a forward rate detector that estimates a minimum time interval between transitions in an input signal;
clock recovery circuit that determines a clock signal based on the estimated minimum time interval; and
a measurement circuit that performs a time domain measurement on the input signal based on the determined clock signal;
wherein the forward rate detector comprises
a minimum transition interval detection circuit that compares time intervals between consecutive transitions in the input signal with one or more reference intervals, the minimum transition interval detection circuit comprising
a set of delay elements that generate a set of delayed input signals based on a set of predetermined delay times; and
a comparator that compares transitions in the set of delayed input signals with the transitions in the input signal.

40. The apparatus of claim 39, wherein the forward rate detector comprises:
an encoder that identifies nearest ones of the set of predetermined delay times that are before and after the minimum time interval between the transitions in the input signal.

41. An apparatus comprising:
a forward rate detector that estimates a minimum time interval between transitions in an input signal;
a clock recovery circuit that determines a clock signal based on the estimated minimum time interval; and
a measurement circuit that performs a time domain measurement on the input signal based on the determined clock signal;
wherein the forward rate detector comprises:
a minimum transition interval detection circuit that compares time intervals between consecutive transitions in the input signal with one or more programmable reference intervals; and
a register that adjusts the programmable reference intervals such that one or more of the adjusted reference intervals match the minimum time interval between the transitions in the input signal.

* * * * *